United States Patent
Pardini et al.

(10) Patent No.: US 6,205,182 B1
(45) Date of Patent: *Mar. 20, 2001

(54) ENCODING A CLOCK SIGNAL AND A DATA SIGNAL INTO A SINGLE SIGNAL FOR DISTRIBUTION IN A SIGNAL FORWARDING DEVICE

(75) Inventors: Raffaello Pardini, San Jose; Mohammad Seyed Nikuie; David A. Hughes, both of Mountain View, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,629

(22) Filed: Feb. 25, 1998

(51) Int. Cl.[7] .............................. H03C 5/00; H03K 7/00; H03K 9/00
(52) U.S. Cl. ............................................................. 375/260
(58) Field of Search ..................................... 375/316, 355, 375/360, 342, 377, 259, 260, 241, 242, 239, 237, 238, 359, 364, 371

(56) References Cited

U.S. PATENT DOCUMENTS

| 4,527,277 | * | 7/1985 | Kosaka et al. . |
| 5,033,064 | * | 7/1991 | Upp . |
| 5,067,126 | * | 11/1991 | Moore . |
| 5,095,289 | * | 3/1992 | Whiteside . |

OTHER PUBLICATIONS

Leon W. Couch II, "Digital and Analog Communication Systems", Second Edition, ISBN 0–02–325380–0, 1987, 22 pages.

Donald G. Fink, Donald Christiansen, "Electronics Engineers' Handbook", 3rd Edition, ISBN 0–07–020982–0, 1989, 9 pages.

* cited by examiner

Primary Examiner—Chi H. Pham
Assistant Examiner—Jean B. Corrielus
(74) Attorney, Agent, or Firm—Blakely, Sokoloff, Taylor & Zafman LLP (57) ABSTRACT

An apparatus and method for encoding a clock signal and a data signal into a single signal. A first digital signal is received and a second digital signal having a periodic waveform is received. A sequence of pulses is generated at a pulse frequency of the second digital signal. Each pulse of the sequence of pulses has either a first duration or a second duration based upon a respective sample of the first digital signal.

17 Claims, 7 Drawing Sheets

ENCODING A CLOCK SIGNAL AND A DATA SIGNAL INTO A SINGLE SIGNAL FOR DISTRIBUTION IN A SIGNAL FORWARDING DEVICE

FIELD OF THE INVENTION

The present invention relates to the field of digital communications, and more particularly to digital signal distribution.

BACKGROUND OF THE INVENTION

Trunk lines in modern telecommunications networks are typically arranged in a bandwidth hierarchy in which each type of trunk line is capable of carrying data from multiple hierarchically lower types of trunk lines. For example, in North America, Type 1 (T1) trunk lines are operated at a bitrate of 1.544 Mb/s (megabit per second) and can communicate up to twenty-four 0.064 Mb/s voice frequency (VF) signals at a time. The twenty-four VF signals are sampled one after another, digitized to respective bytes and time-division multiplexed onto the T1 carrier to generate each frame of a Type 1 Digital Signal (DS-1). Type 3 (T3) trunk lines are operated at a bitrate of 44.736 Mb/s (megabit per second) and are capable of time-division multiplexing up to twenty-eight DS-1 signals in a single Type 3 Digital Signal (DS-3). Even higher bandwidth trunk lines in the TDM hierarchy are available to multiplex DS-3 signals from multiple T3 lines.

To reduce the number of physical connections between trunk lines and signal forwarding equipment (e.g., trunk multiplexers, network routers and network switches), it is common to connect a relatively small number of high bandwidth trunk lines to the signal forwarding equipment instead of a larger number of lower bandwidth trunk lines. For example, instead of connecting 84 T1 cables to a signal forwarding device, three T3 cables may be connected instead. The 84 DS-1 signals that otherwise would have been received on discrete T1 lines are extracted from the DS-3 signal on the incoming T3 line.

One problem that arises when relatively high bandwidth trunk lines are connected directly to a signal forwarding device is that of distributing the extracted signals throughout the device. Signal forwarding devices typically include multiple service modules that are used to handle incoming signals in parallel. In many cases the service modules are removably connected to a backplane (or midplane) of the signal forwarding device and signals are passed between the service modules via traces in the backplane. When incoming signals are concentrated at one service module and then distributed to other service modules, the required number of backplane traces is increased significantly. For example, if 84 DS-1 signals extracted from three T3 lines on one service module are to be serviced by other service modules in a signal forwarding device, 84 additional backplane traces are required. To make matters worse, when trunk signals are extracted from higher frequency trunk signals, it is common to generate a separate clock and data signal for each extracted trunk signal. Thus, in the example above, up to 168 additional backplane traces may be required to distribute the clock and data for the 84 DS-1 signals. In many devices, physical constraints on the density of backplane traces prevent this amount of signal distribution.

One possible solution to the problem of wire trace congestion on the device backplane is to increase the data transmission frequency to obtain more bandwidth out of each backplane trace. However, due to the frequency response characteristics of signal traces on the backplanes of many devices, it is not possible to substantially increase signal transmission frequency without unacceptable loss of signal quality.

SUMMARY OF THE INVENTION

A method and apparatus for encoding a clock signal and a data signal into a single signal are disclosed. A first digital signal and a second digital signal are received, the second digital signal being a periodic waveform. A sequence of pulses are generated having a pulse frequency substantially equal to the frequency of the second digital signal. Each pulse of the sequence of pulses has either a first duration or a second duration based on a respective sample of the first digital signal.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to embodiments of the present invention, the number of conductors required to distribute digital data and clock signals that correspond to incoming trunk line signals is reduced by encoding data and clock signal pairs into respective pulse trains and transmitting the pulse trains instead of the constituent data and clock signals. Because each pulse train can be transmitted on a single wire instead of the two wires otherwise required to transmit separate clock and data signals, and because each pulse train has a pulse frequency substantially equal to the frequency of the clock signal portion of the signal pair, embodiments of the present invention make it possible to halve the number of wires required to distribute incoming trunk line signals without substantially increasing signal frequency. This and other intended advantages of the present invention are described below.

Figure 1:
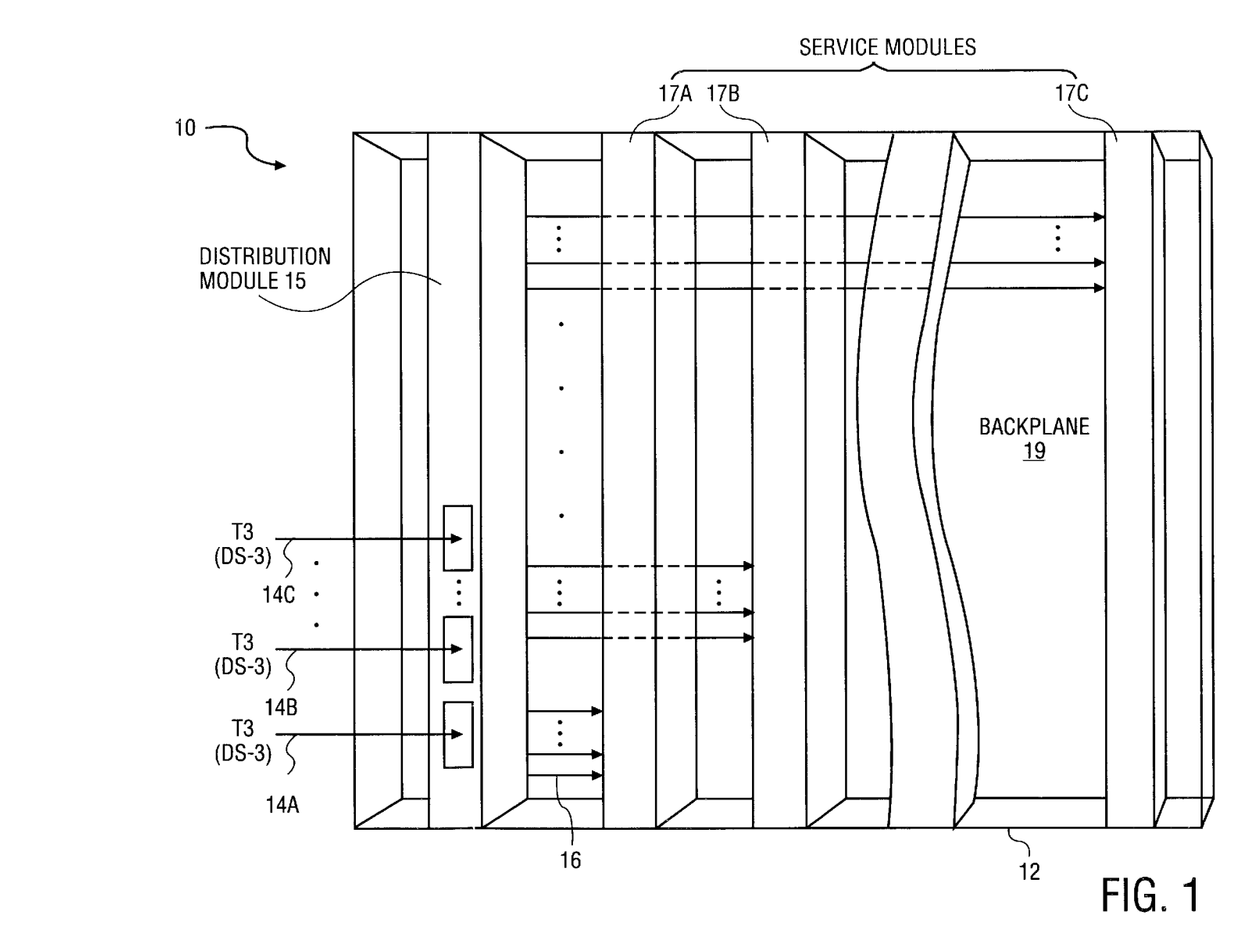
FIG. 1 depicts a signal forwarding device in which embodiments of the present invention may be used.

FIG. 1 depicts a signal forwarding device 10 in which embodiments of the present invention may be used. The signal forwarding device 10 may be a trunk line multiplexer/demultiplexer, a network switch, a network router, or any other type of device in which signals are demultiplexed from incoming trunk lines and distributed among components of the device. In one embodiment, the signal forwarding device 10 includes a rack-mountable card frame 12 that houses a backplane 19 into which a distribution module 15 and a plurality of service modules 17a, 17b, 17c are removably connected. The service modules 17a, 17b, 17c may be interchangeable with one another, or they may include one or more special-function modules requiring a dedicated position in the device backplane 19. Also, the backplane 19 may be a midplane that allows connection of modules on both sides. Herein, the term backplane is used to indicate any wire-trace board into which two or more circuit cards can be connected including, but not limited to, midplanes and conventional backplanes.

As shown in FIG. 1, the distribution module 15 is connected to a number of T3 lines 14a, 14b, 14c, each of which supplies a DS-3 signal. Each T3 line is typically a coaxial cable that is connected to a line interface unit (LIU) on the signal forwarding device 10. The LIU decodes the line-encoded DS-3 signals 14a, 14b, 14c into separate clock and data signals which may be further processed to extract multiple DS-1 signals 16. The DS-1 signals 16 are then forwarded via the backplane 19 to the service modules 17a, 17b, 17c where they may be further demultiplexed to obtain multiple VF signals. Although DS-3 and DS-1 trunk signals are principally discussed herein, different types of trunk signals may be received in the distribution module 15, demultiplexed into lower frequency trunk signals and distributed among the service modules 17a, 17b, 17c via the device backplane 19 in alternate embodiments. For example, trunk lines that are prevalent throughout much of Europe and which carry signals conforming to the multiplexing hierarchy adopted by the International Telecommunications Union (ITU) may be connected to the signal forwarding device 10 in alternate embodiments.

Figure 2:
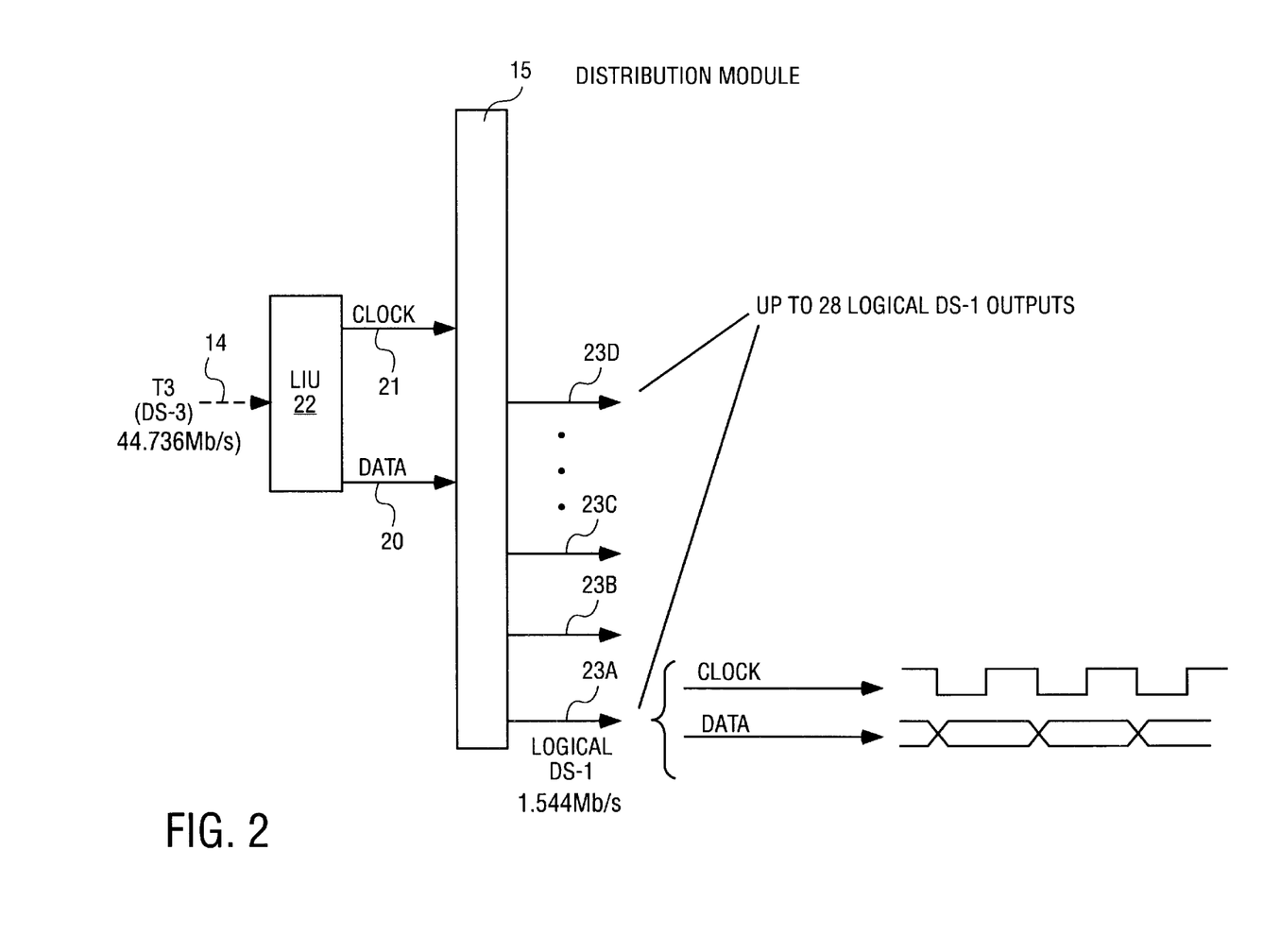
FIG. 2 illustrates the distribution of signals received via a T3 trunk line.

FIG. 2 illustrates the distribution of signals received via a T3 trunk line 14. As discussed above, the DS-3 signal carried by the T3 line 14 is typically converted to a separate clock signal 21 and data signal 20 by a LIU 22. To avoid confusion, the data and clock signal pair (20, 21) is referred to herein as a "logical DS-3" signal to distinguish it from a true DS-3 signal which is typically transmitted in a bipolar return-to zero (RZ) signaling format. One reason for converting the true DS-3 signal into a logical DS-3 signal is that the bipolar RZ signaling format is a pseudoternary signal (more than two signal levels are present) and not a binary signal. By converting the true DS-3 signal into a logical DS-3 signal having binary digital signal components (20 and 21), binary logic elements can be used to manage the logical DS-3 signal.

In one embodiment, the distribution module 15 receives the logical DS-3 signal (20, 21) and demultiplexes it into multiple (up to 28) DS-1 signals 23a, 23b, 23c, 23d. Demultiplexing may be accomplished by sampling the incoming bits of the DS-3 signal and distributing them in round-robin fashion among the outgoing DS-1 signal paths 23a, 23b, 23c, 23d. In one embodiment, each DS-1 signal 23a, 23b, 23c, 23d includes a binary clock signal and a binary data signal and, as with the logical DS-3 signal mentioned above, the clock and data signal pair that correspond to a DS-1 signal is referred to as a "logical DS-1 signal" to distinguish it from a "true" DS-1 signal which is typically encoded in a non-binary format.

As FIG. 2 demonstrates, a total of 56 signal paths are required to distribute a full complement of 28 logical DS-1 signals (each including a clock/data signal pair) received on the T3 line 14. Consequently, if signal distribution takes place via a device backplane, the wire trace capacity of the backplane may be exceeded by only two or three T3 lines. Thus, the logistics of distributing incoming signals across the device backplane may limit the number of T3 lines that could otherwise be serviced by the signal forwarding device. In embodiments described herein, this limitation is avoided by encoding the clock/data signal pair of the logical trunk signal into a pulse train that has a pulse frequency that is substantially equal to the frequency of the clock signal portion of the logical trunk signal. In this way, the number of signal distribution lines is halved, but without substantially increasing the frequency of the signal used to transmit the clock and data information.

Figure 3:
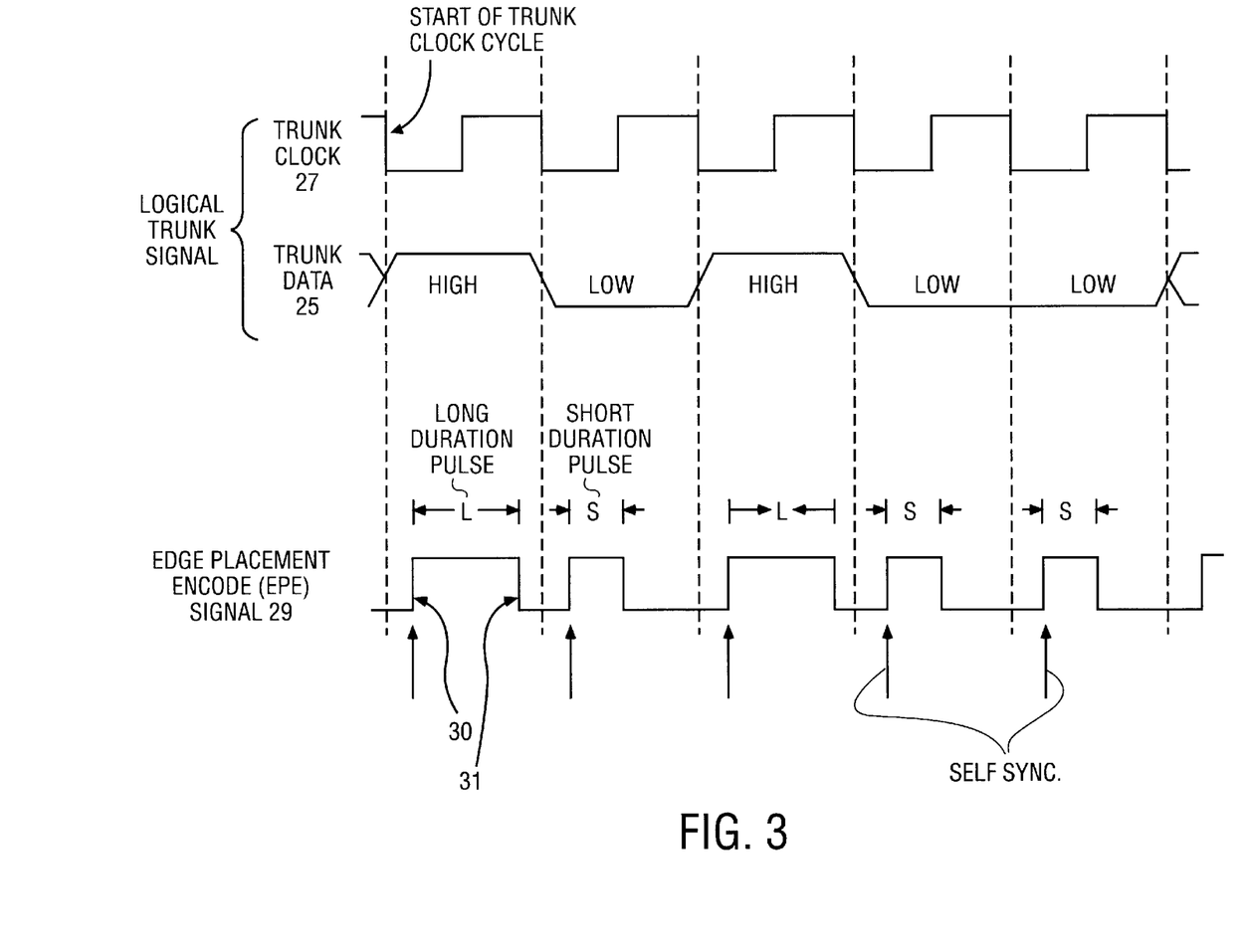
FIG. 3 is a waveform diagram that illustrates a pulse train used to encode a logical trunk signal according to one embodiment.

FIG. 3 is a waveform diagram that illustrates a pulse train 29 used to encode a logical trunk signal (e.g., a logical DS-1 signal) according to one embodiment. As discussed above, a logical trunk signal includes a clock signal 27 and a data signal 25, both of which are binary digital signals. These signal components are referred to herein as a "trunk clock" signal 27 and a "trunk data" signal 25 to emphasize their relationship to the original trunk signal (be it DS-1 or another type of trunk signal). For the purpose of the present discussion, an exemplary sequence of trunk data values is shown. During the first shown cycle of the trunk clock 27, the trunk data 25 is a logically high voltage potential (a "high"). During the second cycle of the trunk clock 27, the trunk data 25 is at a logically low voltage potential (a "low"), and so forth.

In response to each new cycle of the trunk clock 27, a pulse is generated in encoded signal 29 to represent the state of the trunk data 25. According to various embodiments, the state of the trunk data 25, high or low, is indicated by the duration of the pulse in encoded signal 29. That is, the pulse has a first or second duration depending on whether the trunk data 25 is high or low during the cycle of the trunk clock 27 in question. Thus, for the exemplary data sequence of high, low, high, low and low trunk data values (signal 25) shown in FIG. 3, pulses having, long, short, long, short and short durations, respectively, are generated in encoded signal 29. Because the placement of one edge of a pulse relative to the other edge of the pulse is used to encode each trunk data value, the pulse train 29 is referred herein to as an edge-placement encoded (EPE) signal 29.

In one embodiment, each pulse of the EPE signal 29 is defined by a rising edge 30 that is generated in response to detection of a new cycle of the trunk clock 27 and a falling edge 31 that occurs either a first time period or a second time period after the rising edge 30 depending on one or more samples of the trunk data signal 25. Because each rising edge of the EPE signal 29 is generated within a predetermined time after the beginning of a new cycle of the trunk clock signal 27, the pulse frequency of the EPE signal 29 is substantially equal to the trunk clock frequency and the leading edge of each pulse in the EPE signal 29 can be used to regenerate a trunk clock in a receiving module or device. In other words, the EPE signal 29 is a self-synchronizing signal that carries its own clocking information.

As discussed below, the exact time interval between the leading edges of a given pair of pulses in the EPE signal 29 may vary slightly from the period of the trunk clock signal 27. Consequently, the pulse frequency of the EPE signal 29 over any finite time interval may not be precisely the same as the frequency of the trunk clock signal 27 over that same time interval. In the general case, however, one pulse in the EPE signal is generated for each cycle of the trunk clock signal so that the pulse frequency of the EPE signal 29 is considered to be substantially equal to the trunk clock signal 27.

In alternate embodiments, the format of the EPE signal 29 may be different from that shown in FIG. 3. For example, each pulse of the EPE signal 29 could begin with a falling edge that is generated in response to detecting a new cycle of the trunk clock signal and end with a rising edge that occurs either a first time period or a second time period later. Also, a trunk data signal that is high may be represented by a short pulse instead of a long pulse in alternate embodiments. Generally, any sequence of pulses in which the duration of the pulses is used to communicate trunk line data and edges of the pulses are used to communicate trunk line clock information is within the scope of the present invention.

Figure 4:
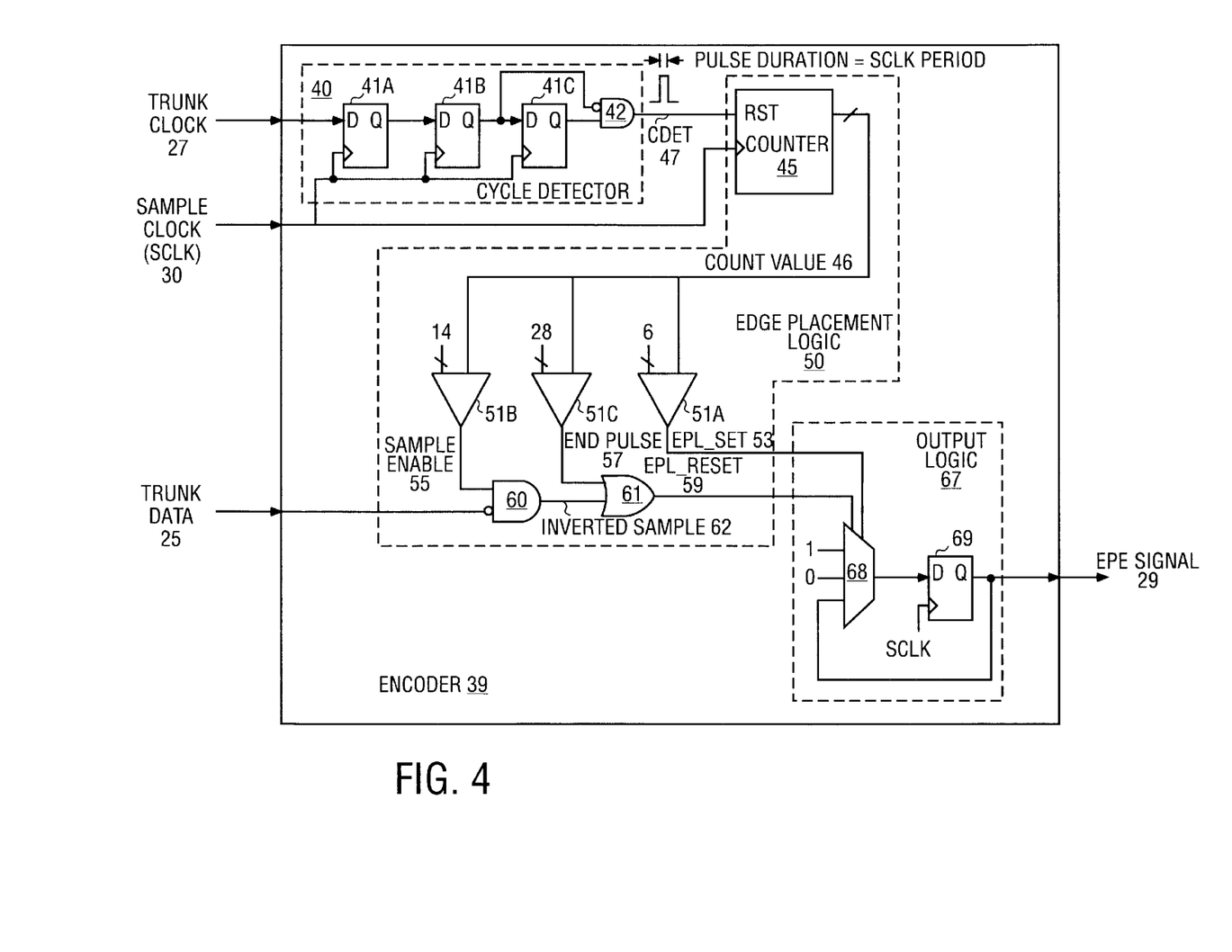
FIG. 4 is a diagram of one embodiment of a encoder for generating an edge-placement encoded signal.

FIG. 4 is a logic diagram of an embodiment of an encoder 39 that can be used to generate an EPE signal 29. The encoder 39 receives a trunk clock/data signal pair (27, 25) and a sample clock 30 as inputs. In one implementation the sample clock 30 is operated at 50 MHz, but higher or lower sample clock frequencies may be used. According to one embodiment, the encoder 39 includes a cycle detector 40 to generate a cycle detect signal 47 in response to each cycle of the trunk clock signal 27, edge placement logic 50 to initiate a pulse in response to each assertion of the cycle detect signal 47 and to terminate the pulse after either a first time period or a second time period based on a sample of the trunk data signal 25, and output logic 67 to output the pulse waveform indicated by signals from the edge placement logic 50.

In one embodiment, the cycle detector 40 includes a combinatorial logic gate 42 and a sequence of flip-flops 41*a*, 41*b*, 41*c* clocked by the sample clock 30. Because the sequence of flip-flops 41*a*, 41*b*, 41*c* are connected in a cascade arrangement (output of one to the input of the next) and because the trunk clock signal 27 is coupled to the input of the first flip-flop 41*a*, the outputs of each of the three flip-flops 41*a*, 41*b*, 41*c* track the trunk clock signal 27, with each flip-flop output being delayed by one cycle of the sample clock 30 from that of the preceding flip-flop. Because there are three flip-flops 41*a*, 41*b*, 41*c* in the sequence (there may be more or fewer flip-flops in an alternate embodiment), within three cycles of the sample clock 30 after a transition of the trunk clock 27 to a high or low state, each of the three flip-flops 41*a*, 41*b*, 41*c* will also output the high or low state.

In the embodiment depicted in FIG. 4, the outputs of the second and third flip-flops 41*b*, 41*c* are supplied to the combinatorial logic gate 42. Because one input of the combinatorial logic gate 42 is inverted, the output of the combinatorial logic gate 42 goes high when the output of the second flip-flop 41*b* is low and the output of the third flip-flop 41*a* is high. Consequently, when the output of the second flip-flop 41*b* goes low in response to a new cycle of the trunk clock 27, the output of the combinatorial logic gate becomes high and remains high until the output of the third flip-flop 41*c* goes low one cycle of the sample clock 30 later. The result is a pulse 47 output by the combinatorial logic gate 42 during the second sample clock cycle after the beginning of each new cycle of the trunk clock signal 27. Because the pulse 47 is generated within a predetermined time after the start of each new trunk clock cycle, the pulse is referred to as a cycle detect signal 47 (CDET). Other techniques may be used to detect the start of each new trunk clock cycle without departing from the spirit and scope of the present invention.

In one embodiment, the edge placement logic 50 includes a counter 45, count comparators 51*a*, 51*b*, 51*c* and combinatorial logic elements 60 and 61. The counter 45 counts cycles of the sample clock signal 30 and outputs a count value 46 to each of the count comparators 51*a*, 51*b*, 51*c*. In one embodiment, the count value 46 is carried on a multi-conductor path with each conductor carrying a higher order binary digit than the previous conductor (e.g., $2^0$, $2^1$, $2^2$, etc.). Each of the count comparators compares the count value 46 against a predetermined count and asserts a signal (e.g., a high or low) if the count value 46 matches the predetermined count. In the exemplary embodiment depicted in FIG. 4, the output of a first count comparator 51*a* goes high when the count value 46 reaches six, the output of a second count comparator 51*b* goes high when the count value reaches fourteen and the output of a third count comparator goes high when the count value reaches twenty-eight. Of course, other predetermined counts may be used.

According to one embodiment, the counter 45 is reset to zero by the cycle detect signal from the cycle detector. Thus, in response to each new cycle of the trunk clock 27, the counter 45 begins counting anew. When the count value 46 output by the counter 45 reaches a first predetermined value (in this example, six) the first count comparator 51*a* outputs a signal called EPL_SET 53 (Edge Placement Logic—SET). As discussed below, assertion of EPL_SET causes the output logic 67 to generate the leading edge of a new pulse in the output EPE signal 29. When the count value 46 reaches a second predetermined value (in this example, fourteen), the second comparator 51*b* outputs a sample enable signal 55. The sample enable signal 55 is input to a first of the combinatorial logic elements 60 to gate an inverted sample 62 of the trunk data signal 25 through the first combinatorial logic element 60. If the trunk data signal 25 is at a high potential, then a low inverted sample value 62 is output by the first combinatorial logic element 60 and input to the second combinatorial logic element 61. Conversely, if the trunk data signal 25 is at a low potential, then a high inverted sample value 62 is output from the first combinatorial logic element 60 to the second combinatorial logic element 61. In one embodiment, the second combinatorial logic element 61 is an OR gate which outputs an EPL_RESET signal 59 (Edge Placement Logic—RESET) in response to a high state at either of its inputs. As discussed below, the EPL_RESET signal 59 results in the termination of a pulse by the output logic 67. Thus, if the trunk data value 25 is low when sampled, a high inverted sample 62 is output by the first combinatorial logic element 60 causing the EPL_RESET signal 59 to be asserted to terminate a pulse. In other words, in the embodiment of FIG. 4, a low trunk data value 25 results in the generation of a pulse having a duration determined by the difference between the first and second predetermined count values. If the trunk data signal 25 is high when sampled, a low inverted sample 62 is output. Consequently, if the trunk data signal 25 is high when sampled, the EPL_RESET signal 59 is not asserted when the count value 46 reaches the second predetermined value and the EPL_RESET signal 59 is instead asserted later, when the count value 46 reaches the third predetermined value (in this example, twenty-eight). At that point an end pulse signal 57 is output by count comparator 51*c* to produce the EPL_RESET signal 59. Thus, a relatively long duration pulse is generated to represent a high trunk data value 25, the pulse duration being determined by the difference between the first and the third predetermined count values. In this way the count comparators 51*a*, 51*b*, 51*c* and the combinatorial logic elements 60 and 61 operate to control generation of pulses having a first duration or a second duration depending on respective samples of the trunk data signal 25.

It will be appreciated that because the first, second and third predetermined count values establish the data sampling time and the durations of the short and long pulses, it may be desirable to make these predetermined count values user-configurable so that the same encoding logic can be used to encode logical trunk signals having different timing characteristics. In one embodiment, a user interface, a storage element and processing logic is included in the signal forwarding device. The processing logic obtains predetermined count values entered via the user interface and stores the count values in the storage element. The count values are supplied from storage element to the encoder to control the output of the comparators. In alternate embodiments, the predetermined count values may be established during manufacture by external equipment such as a device for programming the predetermined count values into a nonvolatile storage element included in the signal forwarding device. The predetermined count values could be programmed according to the application of the signal forwarding device thereby obviating redesign of the signal forwarding device hardware for each new type of signal to be encoded.

Still referring to FIG. 4, because the EPL_SET signal 59 is asserted a predetermined number of sample clock cycles after detecting the start of a new cycle of the trunk clock signal 27, the leading edge of each pulse in the EPE signal 29 is offset from the leading edge of a previous pulse by one cycle of the trunk clock 27, plus or minus a sample clock cycle (a trunk clock cycle may begin early or late within a sample clock cycle so that some timing jitter may be present in the cycle detect signal 47). Consequently, the EPE signal 29 is self-synchronizing, with the leading edge of each new pulse being available to regenerate a clock signal in a recipient device.

In one embodiment, the output logic 67 includes a multiplexer 68 and a flip-flop 69. Initially, the EPL_SET signal 53 and the EPL_RESET signal 59 are deasserted so that the multiplexer 68 passes the output of the flip-flop 69 back to the input of the flip-flop 69. When the EPL_SET signal 53 is asserted, a signal having a high state is passed through the multiplexer 68 and propagated to the encoder output by the flip-flop 69 in response to the next rising edge of the sample clock signal 30. This is the beginning of a pulse in the EPE signal. When the EPL_SET signal 53 is deasserted, the output of the flip-flop 69 is again fed-back to the flip-flop 69 input so that the state of the EPE signal 29 is maintained. When the EPL_RESET signal 59 is asserted, the multiplexer 68 outputs a low signal which is propagated to the encoder output in response to the next rising edge of the sample clock signal 30. Thus, the EPL_RESET signal 59 causes the output logic 67 to generate the trailing edge of the pulse. It will be appreciated that the high and low states of a pulse may be reversed so that the leading edge of each pulse is a falling edge and the trailing edge of each pulse is a rising edge.

Figure 5:
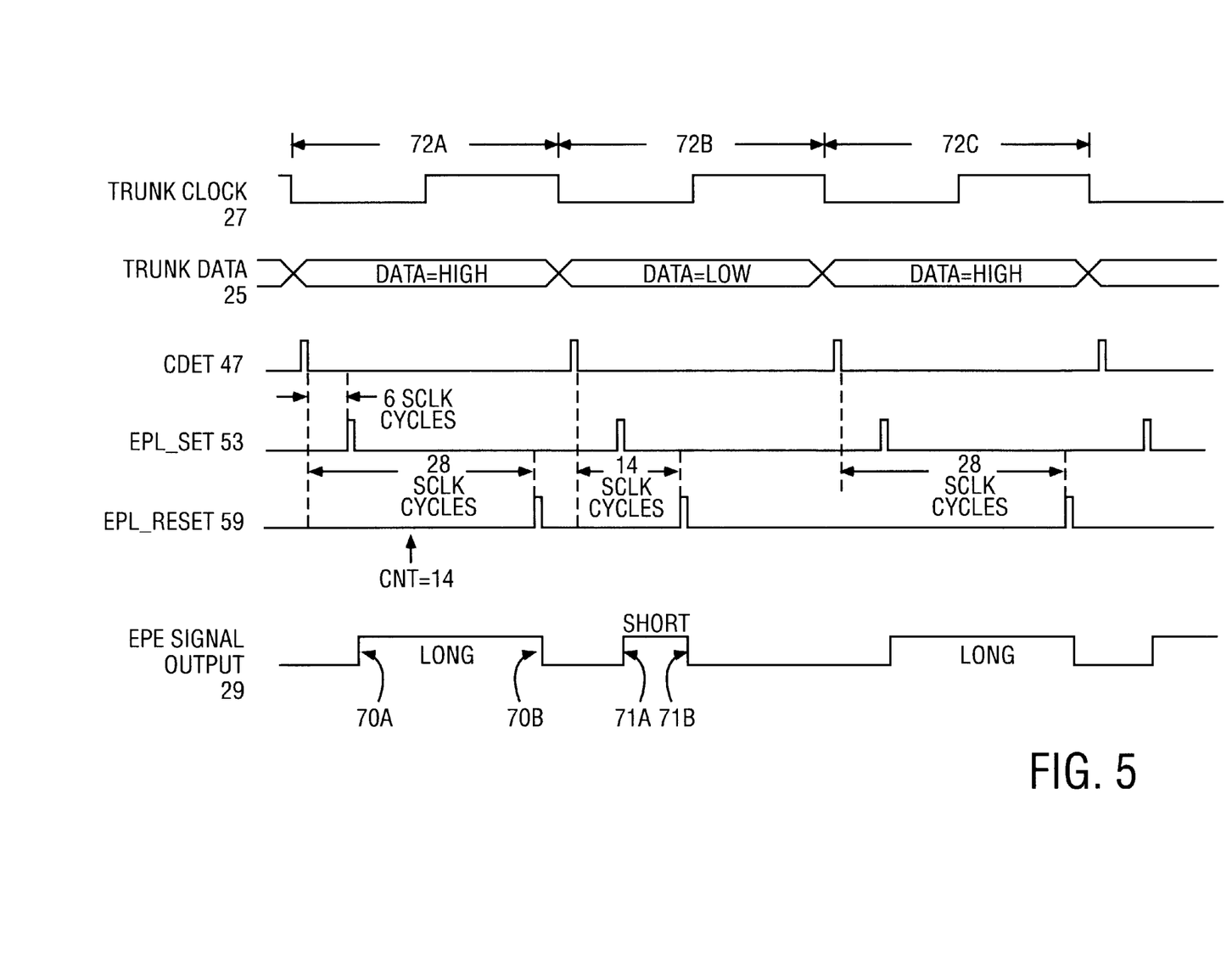
FIG. 5 is a timing diagram illustrating the operation of the encoder of FIG. 4.

FIG. 5 is a timing diagram illustrating the operation of the encoder 39 of FIG. 4. In response to a first cycle 72a of the trunk clock signal 27, the cycle detect signal 47 (CDET) is generated. A first predetermined number of sample clock cycles after CDET (e.g., 6), the EPL_SET signal 53 is generated. As indicated in FIG. 5, this results in a rising edge 70a in the EPE signal 29. After a second predetermined number of sample clock cycles (e.g., 14), the trunk data signal 25 is sampled. In this example, because the trunk data signal 25 is high during the first cycle of the trunk clock signal 27, the EPL_RESET signal 59 is not asserted and the EPE signal 29 remains high. After a third predetermined number of sample clock cycles (e.g., 28), the EPL_RESET signal is asserted to terminate the pulse in the EPE signal. This is shown at 70b. In this way a pulse having a relatively long duration is generated to represent the high trunk data value.

The cycle detect signal 47 is generated again in response to the start of a second trunk clock cycle 72b. The EPL_SET signal 53 initiates a pulse in the EPE output signal 29 after the first predetermined number of sample clock cycles. After the second predetermined number of sample clock cycles, the trunk data signal 25 is sampled. In response to detecting that the trunk data signal is low, the EPL_RESET signal 59 is asserted to terminate the pulse in the EPE output signal 29. As a result, a pulse of relatively short duration is generated to represent the low trunk data value. The leading and trailing edges of this pulse are shown at 71a and 71b, respectively. In the third cycle 72c of the trunk clock signal 27, another relatively long pulse is generated to represent the high trunk data value. As mentioned above, because each pulse in the EPE output signal 29 occurs within a predetermined time after the beginning of each new cycle of the trunk clock signal 27, the leading edge of each pulse can be used to regenerate the trunk clock signal in a recipient device.

Figure 6:
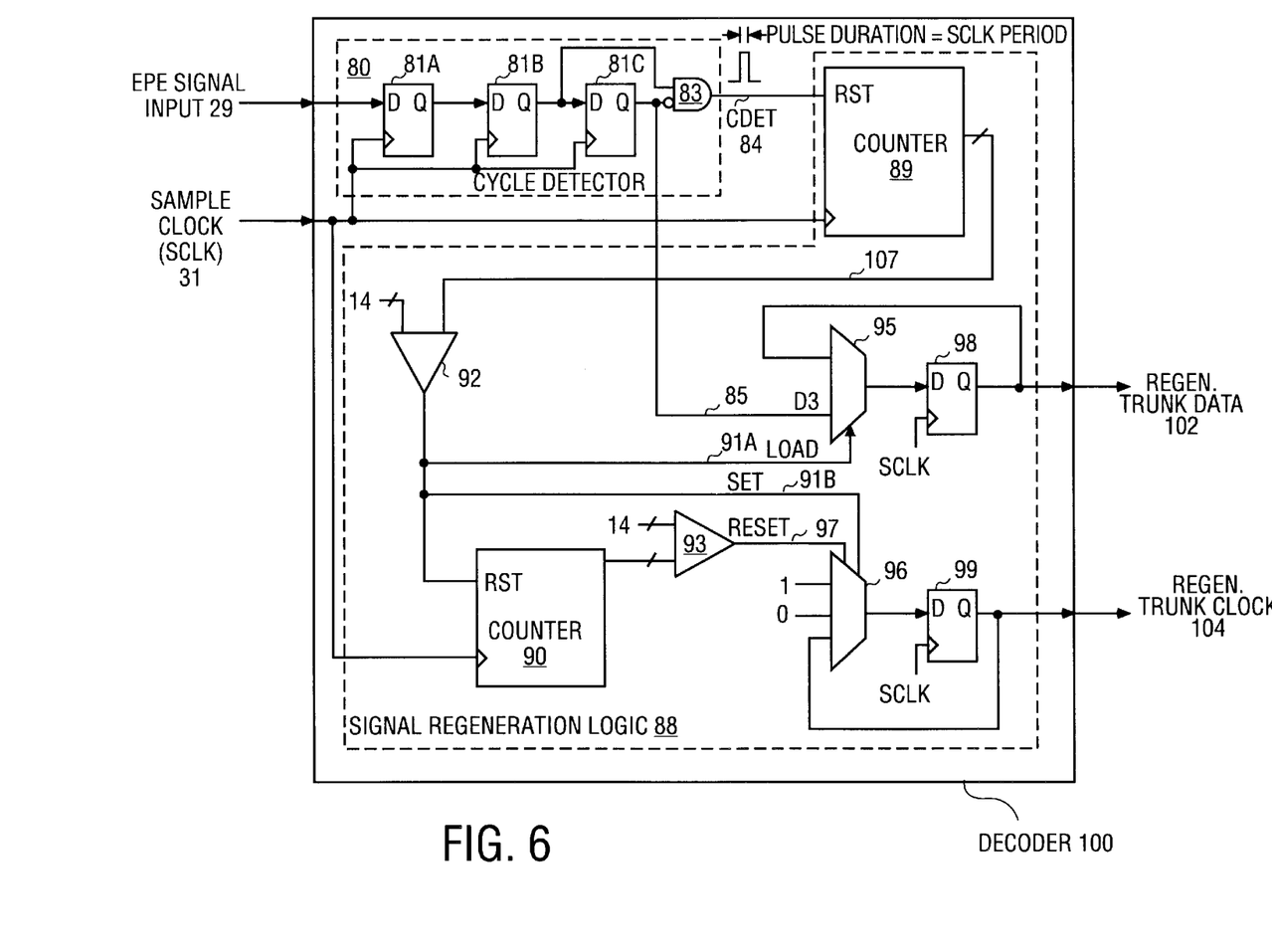
FIG. 6 is a diagram of one embodiment of a decoder for decoding an edge-placement encoded signal into regenerated trunk clock and data signals.

FIG. 6 is a diagram of a decoder 100 that can be used to decode an EPE signal according to one embodiment. The decoder 100 includes a cycle detector 80 and signal regeneration logic 88 and receives an EPE signal 29 and a sample clock signal 31 as inputs.

The cycle detector 80 operates in a manner similar to the cycle detector 40 in the encoder 39 discussed above. The output of each of the flip-flops 81a, 81b, 81c tracks the input EPE signal 29, but is delayed by one cycle of the sample clock 21 relative to the output of the preceding flip-flop in the sequence. As discussed above, in one embodiment, the leading edge of each pulse in the incoming EPE signal 29 occurs within a predetermined time after the beginning of a trunk clock cycle. This timing relationship is exploited in the decoder 100 by using the cycle detector 80 to detect the leading edge of each incoming pulse and to initiate the generation of a new cycle of regenerated trunk clock and data signals in response. Assuming that the output of each of the sequence of flip-flops 81a, 81b, 81c is initially low, when the leading edge of a pulse in the EPE signal 29 has propagated through the first two flip-flops 81a, 81b but not the third flip-flop 81c, the combinatorial logic gate 83 will output a high signal. When the incoming pulse has propagated through the third flip-flop 81c one sample clock cycle later, the output of the combinatorial logic element 83 will return to the low state so that a pulse 84 having a duration of one sample clock cycle is output by the combinatorial logic element 83. Because this pulse is generated within a predetermined time after each leading pulse edge in the incoming EPE signal 29 (which is itself generated within a predetermined time after the original trunk clock signal), the pulse 84 is referred to as a cycle detect signal 84 (CDET). The cycle detect signal 84 is output to the signal regeneration logic 88 to initiate a new cycle's worth of regenerated clock and data.

In one embodiment, the signal regeneration logic includes first and second counters (89, 90), first and second count comparators (92, 93), first and second multiplexers (95, 96) and first and second flip-flops (98, 99). The first counter 89 outputs a count value 107 indicating the number of sample clock cycles that have elapsed since the cycle detect signal 84 was last asserted. The count value 107 is input to the first count comparator 92 which compares the count value 107 to a first predetermined count value (e.g., fourteen) that corresponds to approximately a one-half clock cycle of the original trunk clock. The output of the first count comparator 92 is coupled to a reset input on the second counter 90, to a load input on the first multiplexer 95 and to a set input on the second multiplexer 96. Thus, when the count value 107 output by the first counter 89 reaches the first predetermined value, the second counter 90 is reset (e.g., to zero), the second multiplexer 96 is signaled to output a low potential and the first multiplexer 95 is signaled to load the data value present at the output of the third flip-flop 81c in the cycle detector 80 into the first flip-flop 98 of the signal regeneration logic 88. Each of these operations are discussed below.

The output of the second multiplexer 96 is input to the second flip-flop 99 so that at the rising edge of the sample clock 31 after the first count comparator 92 asserts the set signal 91b, a low multiplexer output is propagated through the second flip-flop 99 resulting in a transition of the regenerated trunk clock signal 104 from high to low. This is the start of a cycle of the regenerated trunk clock signal 104. At this time, the second counter 90, having been reset by the output of the first count comparator 92, begins counting cycles of the sample clock signal 31 until a second predetermined value (e.g., fourteen) has been reached. In response to the second counter 90 reaching the second predetermined value, the second count comparator 93 asserts a reset signal 97 to the second multiplexer 96. The reset signal 97 causes the multiplexer 96 to output a signal having a high state to the second flip flop 99. On the subsequent rising edge of the sample clock signal 31, the regenerated trunk clock signal 104 transitions from low to high. This represents a mid-cycle transition in the regenerated trunk clock signal 104. So long as the set and reset signals (91b, 97) are not asserted to the second multiplexer 96, the second multiplexer passes the output of the second flip-flop 99 back to the input of the second flip-flop 99 so that the state of the regenerated trunk clock signal 104 is maintained until the next assertion of the set or reset signals (91b, 97). In this way, a regenerated clock signal 104 having an approximately fifty percent duty cycle is generated in response to the incoming EPE signal 29.

The first flip-flop 98 in the signal regeneration logic 88 is used to produce the regenerated trunk data signal 102. So long as the load signal 91a is not asserted by the first count comparator, the output of the first flip-flop 98 is fed back to the input of the first flip-flop 98 via the first multiplexer 95. In this way, the regenerated trunk data signal 102 is maintained at a steady state until the load signal 91a is asserted. As mentioned above, when the load signal 91a is asserted, the output of the third flip-flop 81c in the cycle detector 80 is passed through the first multiplexer 95 to the input of the first flip-flop 98 in the signal regeneration logic 88. Because the output of the third flip-flop 81c in the cycle detector 80 is a version of the EPE signal 29 delayed by up to three cycles of the sample clock signal 31, it is referred to as "D3". The load signal 91a effectively causes the D3 signal 85 to be sampled a predetermined time after the leading edge of a pulse has been detected. In one embodiment, the predetermined time, which is established by the value of the predetermined input to the first count comparator 92, is selected to sample the D3 signal 85 at a time that falls approximately midway between the termination times of a short duration and a long duration pulse. Consequently, if an incoming pulse has a short duration, the trailing edge of the pulse will precede the load signal 91a so that a low potential will be loaded into the first flip-flop 98 of the signal regeneration logic 88 and used to drive a low regenerated data value 102. If the incoming pulse has a long duration, the load signal 91a will precede the trailing edge of the pulse so that a high potential will be loaded into the first flip-flop 98 and used to drive a high regenerated data value 102.

In one embodiment of the decoder 100, the first and second counters 89, 90 are clamped at an upper count limit to prevent their rolling over and generating spurious load/set signals (91a, 91b) or spurious reset signals 97. Also, in an alternate embodiment, the first and second counters may be replaced by a single counter. In such an embodiment, the load/set signals 91a, 91b are asserted when the counter has reached a first predetermined value and the reset signal 97 is generated when the counter reaches a second predetermined value.

Figure 7:
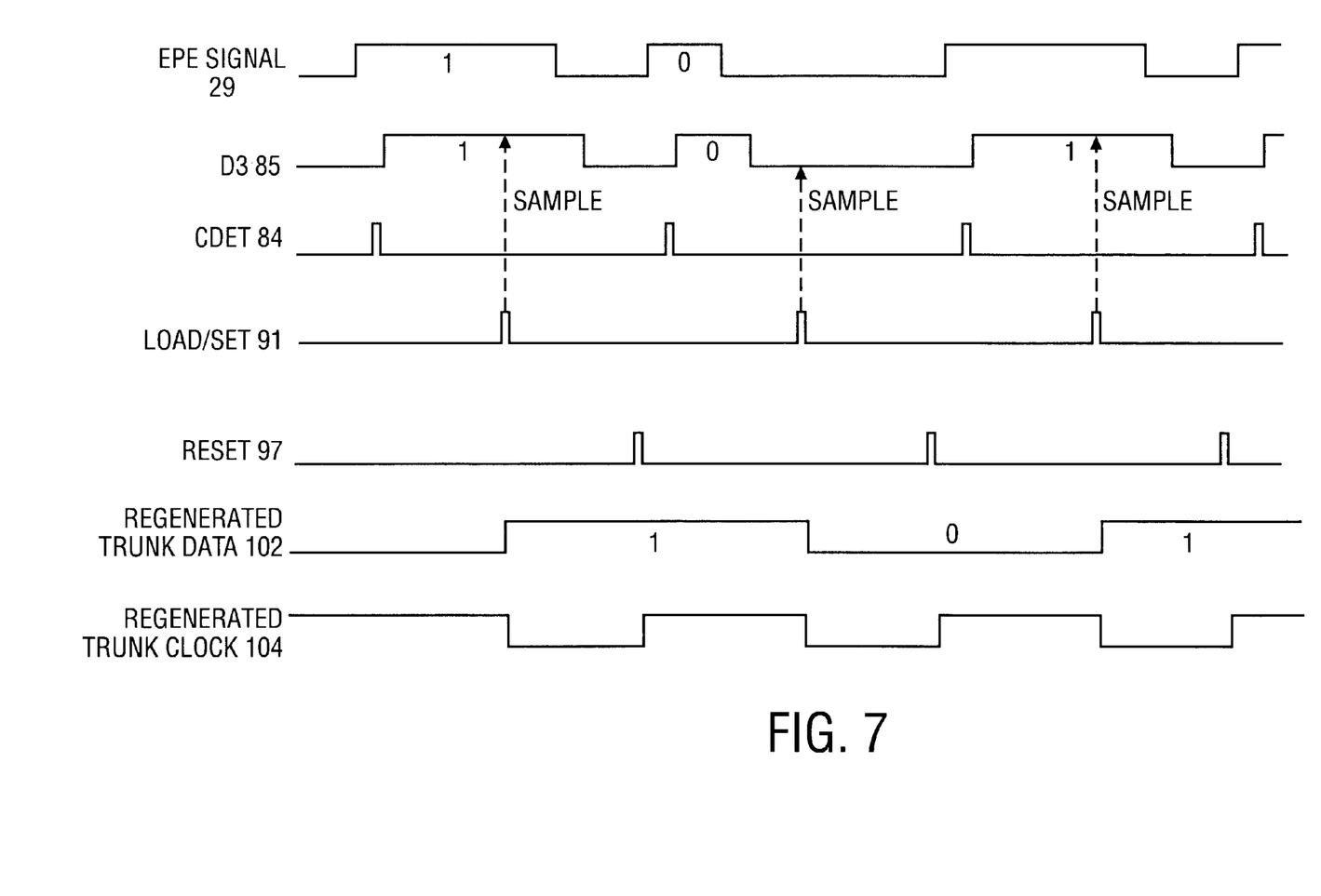
FIG. 7 is a timing diagram illustrating the operation of the decoder of FIG. 6.

FIG. 7 is a timing diagram illustrating the operation of the decoder 100 of FIG. 6. A cycle detect signal 84, CDET, is generated in response to the start of each pulse in the incoming EPE signal 29. A first predetermined time after the cycle detect signal 84 is asserted, the load/set signal 91 (e.g., the signal output by the first count comparator of FIG. 6) is asserted. In response to the load/set signal 91, a new cycle of the regenerated trunk clock signal 104 is begun by transitioning the regenerated trunk clock signal 104 from high to low. After a second predetermined time relative to the cycle detect signal 84, the reset signal 97 is asserted. In response to the reset signal 97, the regenerated trunk clock signal 104 is transitioned from low to high where it remains until the start of the next cycle. As discussed above, in one embodiment the load/set signal 91 and the reset signal 97 are timed relative to the cycle detect signal 84 to produce a regenerated trunk clock signal 104 having approximately a fifty percent duty cycle. shown in FIG. 7, the D3 signal 85 is delayed relative to the incoming EPE signal 29 by up to three cycles of the sample clock. When the load/set signal 91 is asserted, the D3 signal is sampled. As discussed above, the timing of the load/set signal 91 is chosen, in at least one embodiment, to sample the D3 signal 85 at a time which falls approximately midway between the trailing edges of short and long duration pulses. Thus, if the pulse for a given cycle is a long duration pulse as the first pulse shown in FIG. 7 is, a high EPE signal state is sampled by the load/set signal 91 and used to generate a high regenerated data output 102. If the pulse is a short duration pulse, as in the case of the second pulse shown in FIG. 7, a low EPE signal state is sampled by the load/set signal 91 and used to generate a low regenerated data output. By timing the start of each new regenerated clock signal 104 using the same signal as the signal used to establish a new regenerated data value (i.e., the load/set signal 91), a new regenerated data value 102 is asserted at the start of each regenerated clock cycle 104, thus generating regenerated trunk clock and trunk data signals having substantially the same timing relationship as the original trunk clock and trunk data signals.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method, comprising:
  receiving a first digital signal and a second digital signal, the second digital signal being a periodic waveform, and wherein receiving the first digital signal includes:
    receiving a third digital signal and a fourth digital signal, the fourth digital signal being a periodic waveform having a frequency that is N times the frequency of the second digital signal; and generating the first digital signal by sampling the third digital signal during at least one period of each N periods of the fourth digital signal; and generating a sequence of pulses at a pulse frequency substantially equal to the frequency of the second digital signal, each pulse of the sequence of pulses having either a first duration or a second duration based upon a respective sample of the first digital signal.

2. The method of claim 1, further comprising:

receiving the sequence of pulses;

generating a third digital signal that is a periodic waveform having a frequency substantially equal to the pulse frequency of the sequence of pulses; and generating a fourth digital signal that, during each period of the third digital signal, is at either a first voltage potential or a second voltage potential based on a whether a respective one of the sequence of pulses has either the first duration or the second duration.

3. The method of claim 1, wherein the first digital signal and the second digital signal together constitute a logical DS-1 digital signal.

4. The method of claim 1, wherein the third digital signal and the fourth digital signal are obtained from a DS-3 digital signal.

5. The method of claim 1, further comprising:

transmitting the sequence of pulses via a conductor on a backplane to a receiving module that is removably coupled to the back plane; and regenerating in the receiving module respective representations of the first digital signal and the second digital signal based on the sequence of pulses.

6. The method of claim 1, wherein the first digital signal is a data portion of a logical DS-1 signal and the second digital signal is a clock portion of the logical DS-1 signal.

7. A method, comprising:

receiving one or more DS-3 signals in a signal forwarding device;

obtaining a plurality of digital signal pairs from each of the one or more DS-3 signals, each of the plurality of digital signal pairs including a data signal and a clock signal;

encoding the data signal in each digital signal pair into a respective pulse train having a pulse frequency substantially equal to the frequency of the clock signal in the digital signal pair;

transmitting each pulse train via a backplane of the signal forwarding device to one or more receiving modules coupled to the backplane;

receiving each pulse train in at least one of the one or more receiving modules; and decoding each pulse train into a respective digital signal pair, and wherein decoding each pulse train includes:

generating a clock signal having a frequency substantially equal to the frequency of the pulse train; and generating a data signal which, during each period of the generated clock signal, is at either a first voltage potential or a second voltage potential based on the duration of a respective one of the pulses in the pulse train.

8. An apparatus, comprising:

encoding logic to encode a first plurality of digital signal pairs into respective pulse trains, each digital signal pair including a clock signal and a data signal, and wherein the encoding logic includes:

a cycle detector to generate a detect signal in response to each cycle of the clock signal; and edge placement logic coupled to the cycle detector to initiate a pulse in response to each detect signal and to terminate the pulse after either a first time or a second time based on a sample of the data signal;

signal conductors coupled to the encoding logic; and one or more receiving modules coupled to receive the pulse trains from the encoding logic via the signal conductors, the receiving modules including decoding logic to decode the pulse trains into a second plurality of digital signal pairs that are representative of the first plurality of digital signal pairs.

9. The apparatus of claim 8, wherein the encoding logic further includes:

a counter that is reset in response to the detect signal from the cycle detector; and comparator logic which asserts a sample enable signal to sample the data signal after the counter has reached a first predetermined value.

10. The apparatus of claim 9, wherein the edge placement logic terminates the pulse in response to the sample enable signal if the data signal is in a first state when the sample enable signal is asserted, and wherein the edge placement logic terminates the pulse after the counter has reached a second predetermined value if the data signal is in a second state when the sample enable signal is asserted, the second predetermined value corresponding to the second time.

11. The apparatus of claim 8, further comprising:

signal extraction logic to extract the first plurality of digital signal pairs from an incoming trunk line.

12. The apparatus of claim 11, wherein the incoming trunk line is a T3 line carrying a DS-3 signal.

13. The apparatus of claim 8, wherein the decoding logic includes:

a cycle detector to generate a detect signal in response to each pulse of the pulse train; and signal regeneration logic coupled to the cycle detector to generate a regenerated clock signal and a regenerated data signal to constitute each digital signal pair of the second plurality of digital pairs.

14. The apparatus of claim 13, wherein the signal regeneration logic includes:

a first counter that is reset in response to the detect signal from the cycle detector; and comparator logic which asserts a load signal after the counter has reached a first predetermined value, the load signal sampling a pulse from the pulse train to determine, for at least one cycle of the regenerated data signal, whether the regenerated data signal has a first state or a second state, the regenerated data signal having a first state for the at least one cycle if the sampled pulse has a first duration and the regenerated data signal having a second state for the at least one cycle if the sampled pulse has a second duration.

15. The apparatus of claim 14, wherein the pulse from the pulse train that is sampled when the load signal is asserted is delayed by the cycle detector.

16. The apparatus of claim 14, wherein the signal regeneration logic further includes:

logic to set the regenerated clock signal to a first state in response to the cycle detect signal and to reset the regenerated clock signal to a second state a predetermined amount of time after the regenerated clock signal is set to the first state.

17. The apparatus of claim 16, wherein the predetermined amount of time is equal to approximately one-half the time between successive assertions of the cycle detect signal.

* * * * *